United States Patent [19]

Altenbokum et al.

[11] 4,173,906
[45] Nov. 13, 1979

[54] PLANETARY GEAR

[75] Inventors: Karlheinz Altenbokum; Klaus Hänsgen, both of Witten; Heinz M. Hiersig, Düsseldorf, all of Fed. Rep. of Germany

[73] Assignee: Mannesmann Aktiengesellschaft, Düsseldorf, Fed. Rep. of Germany

[21] Appl. No.: 856,049

[22] Filed: Nov. 30, 1977

[30] Foreign Application Priority Data

Dec. 3, 1976 [DE] Fed. Rep. of Germany ....... 2655363

[51] Int. Cl.² .................. F16H 57/00; F16H 1/;28
[52] U.S. Cl. ................................ 74/410; 74/801
[58] Field of Search .............. 74/410, 411, 801, 750 R

[56] References Cited

U.S. PATENT DOCUMENTS 3,964,334  6/1976  Hicks .................................. 74/410

FOREIGN PATENT DOCUMENTS 988743  5/1976  Canada ..................................... 74/410
2655363  6/1978  Fed. Rep. of Germany ............ 74/410

Primary Examiner—C. J. Husar
Assistant Examiner—Frank McKenzie
Attorney, Agent, or Firm—Smyth, Pavitt, Siegemund, Jones & Martella

[57] ABSTRACT

Six planets in a planetary gear are arranged in groups of two each wherein the planets of two groups are similarly spaced, the spacing of the two planets in the third group is larger but still smaller than the spacing from group to group. The radial lines of symmetry of the three groups are angularly spaced by 120°.

8 Claims, 2 Drawing Figures

PLANETARY GEAR

BACKGROUND OF THE INVENTION

The present invention relates to planetary gears of the type having six planet gears.

Assume a planetary gear of particular dimensions, one may increase the transmission capability of such a gear by increasing the number of planets from three to up to seven. In order to evenly distribute the load, i.e. the torque upon all of the planets, particularly when there are more than four of them, one uses the elastic deformation of the outer ring having internal gear teeth (see e.g. "BHS Getriebetechnik", a house publication of the company: Bayrische Berghutten und Salzwerke AG.). The forces needed here for elastically deforming that annulus, produce an asymmetric torque distribution wherein the degree of asymmetry depends upon the permissible elastic deformation.

Another type of load distribution is disclosed, e.g. in US-Letters Pat. No. 3,964,334, having five regularly distributed planet gears. The planet wheels are elastically mounted in the spider or planet carrier, the mount being of a special construction.

Independently from the foregoing, Canadian Pat. No. 988,743 describes a reversible gear for snow vehicles which has six unevenly distributed planet wheels.

DESCRIPTION OF THE INVENTION

It is an object of the present invention to provide a new and improved six planet planetary gearset which does not require elastic deformation for purposes of load equalization, nor should it require elastic mounts of complicated construction for the individual planet gears.

In accordance with the preferred embodiment of the present invention, it is suggested to arrange the six planet gears in groups of two planets each, wherein the planets of each group are spaced closer to each other than to the planets of the (radial other groups on both sides. The groups as such radial lines of symmetry) are equally spaced around the sun gear but the in-group spacing of at least two of the groups differ from one another. In the preferred form, two groups of planets have similar in-group spacing and the planets of the third group are wider spaced. Moreover, at least one of the three components, sun gear, planet carrier or spider, internal gear, are radially displaceable.

The invention provides load equalization without elastic deformation of the internal gear annulus, because the differences in the planet gear spacings as defined produce the required equalization motion, resulting in a stable state. The three groups appear dynamically as the equivalent of just three planet gears as far as the resulting load distribution is concerned. On the other hand, and since there are six planet gears, the ratio of the outer diameter, given by the annular member with internal gear, and of the transmitted torque, is considerably smaller than in the case of a true three planet gear device.

The invention can be practiced generally in situations requiring speed reduction. The invention finds particular utility in cases in which there are dimensional constraints. For example, sheet metal bending machines require two lower rolls to be driven in unison, and these rolls are rather closely spaced. The gear constructed in accordance with the invention is well suited here as high torque/low speed transmission gear.

The invention finds particular utility also in multistage arrangements wherein the last and the penultimate stages are coupled by a floating shaft; the last stage has six planet gears arranged as per the invention, the penultimate stage has only three planets but both stages have the same outer diameter which, with reference to the output torque, is smaller than in the case of a conventional two stage planetary gearset arrangement.

DESCRIPTION OF THE INVENTION

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
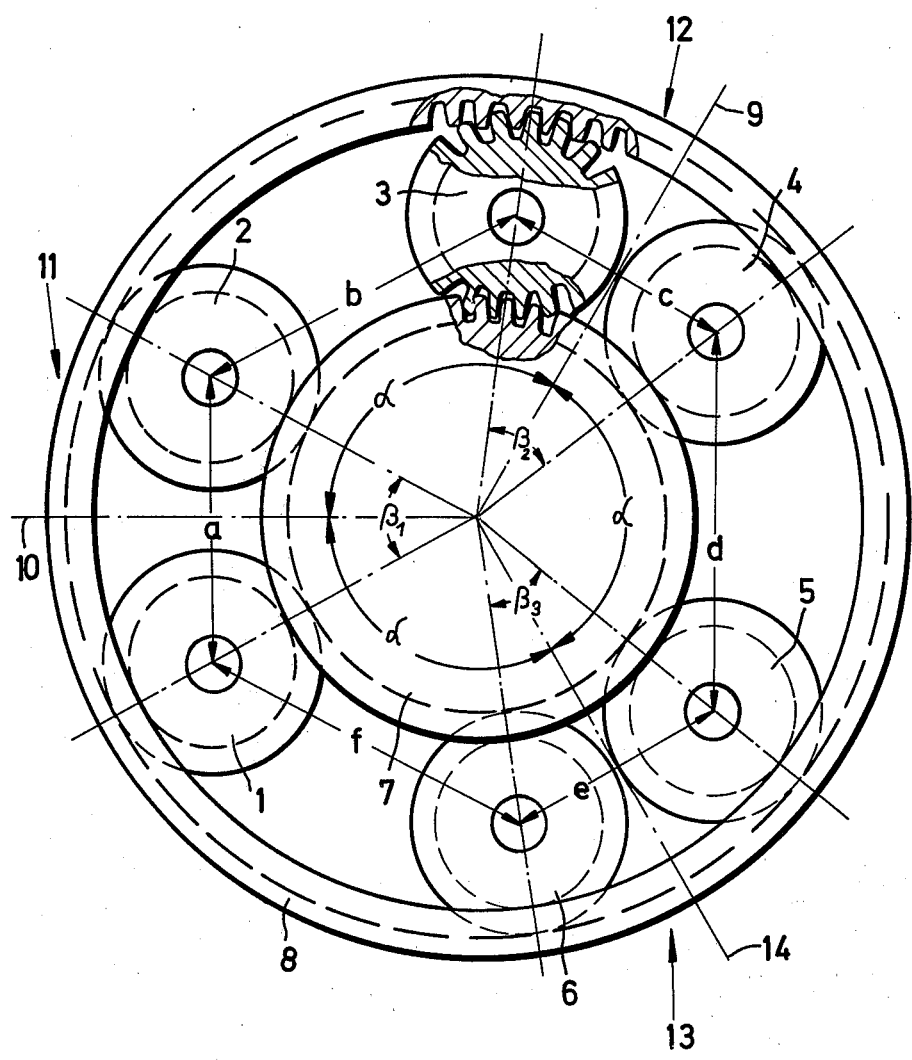
FIG. 1 is a front view of a planet gear with six wheels and being constructed in accordance with the preferred embodiment of the present invention.

Proceeding now to the detailed description of the drawings, the gear shown in FIG. 1 has six planet gears, 1, 2, 3, 4, 5, and 6; a sun gear 7 about which gears 1 to 6 planetate, and an outer annulus or ring with an internal gear 8. The spider interconnecting the planet wheels has been omitted in this drawing (but see FIG. 2); the spider may well be of conventional construction.

The planet gears are arranged in groups whereby gears 1 and 2 establish group 11; gears 3 and 4 establish group 12; and gears 5 and 6 establish group 13. The distances of the axes of gears 1 and 2, the distance of the axes of gears 2 and 3, etc., are denoted a, b, c, d, e, and f, establishing an irregular polygon, whereby a, c, and e constitute in-group distances and b, d, and f are group-to-group distances.

The distances are now so chosen that $a<b$ and $a<f$; $c<b$ and $c<d$; and $e<f$ and $e<d$. In other words, the in-group distances are smaller than the respective group-to-group distances on both sides of each group.

Of course, the journal axes of the six planet gears are located on a circle around the center of rotation, and the linear distances a, b, etc., referred to above, could be replaced by distance values on that circle; the relationship between the distances so defined would be the same.

Reference numerals 9, 10, and 14 denote radial lines of symmetry as between the gears of the three groups; these center lines are angularly spaced by the same angle $\alpha = 120°$. However, the sector angles between radial lines running through the planet gear centers, and the said radial lines of symmetry, differ for the several groups. These angles are denoted $\beta_1$, $\beta_2$, and $\beta_3$, and they differ from each other in the general case, though, in the illustrated preferred example $\beta_2 = \beta_3 < \beta_1$. In other words, the gears of groups 12 and 13 are spaced closer than the gears 1 and 2 of group 11. Thus, one could also say $c = e < a$.

It is assumed that at least one of the elements 7 and 8, or the spider journalling the planet gears, is radially displaceable, the differences in spacing produce the requisite compensatory movement so that the load is evenly distributed. Please note that the angular spacing of the lines of symmetry (9, 10, 14) of 120° makes the six planets appear as if there were just three planets each carrying a double load.

Figure 2:
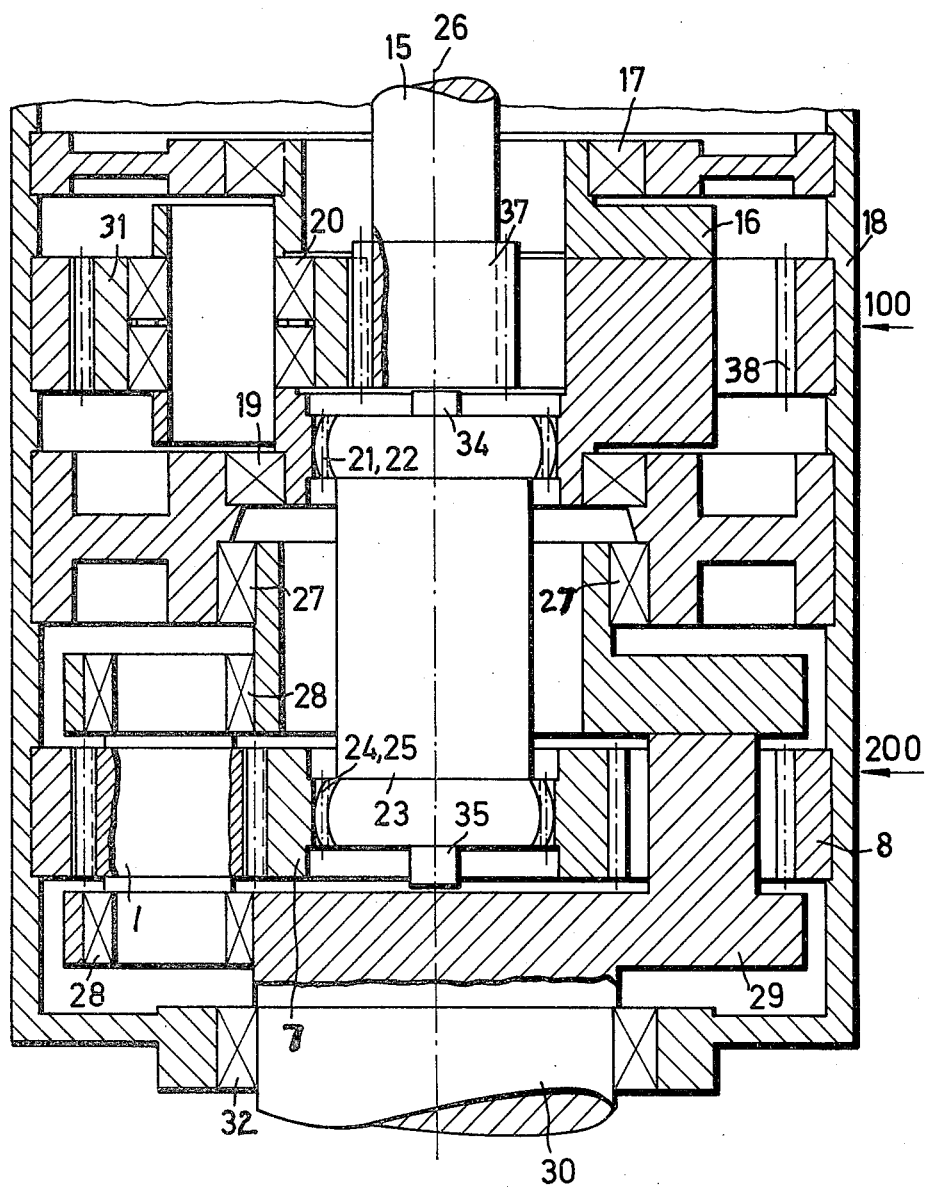
FIG. 2 is a section view through a multi-stage reducing gear incorporating the invention.

After having explained the gear arrangement, we turn to FIG. 2 showing a two-stage reducing gearset, having a first planetary gearset and reducing stage 100, driving a second planetary gearset and reducing stage 200; at least the latter is to have six planet gears arranged as was outlined with reference to FIG. 1. The main objective now is to prevent one planetary gear stage from interfering with the other one as far as load equalization is concerned. Accordingly, a floating intermediate shaft 23 is provided having convexly bulging or contoured spur gears 22 and 25 for interconnecting the two stages.

Specifically, stage 100 is presumed to have a sun gear 37, an outer annular or ring gear 38 with internal gear, and three planet gears such as 31. In addition, this figure shows a spider or planet carrier 16 on which the planet gears 31, etc., are journalled by means of bearings 20. The spider 16 is journalled in housing 18 by means of bearings 17 at the front end of the housing as well as by means of bearings 19 in relation to an internal support. Spider 16 has an internal gear arrangement 21 which is provided in a tubular extension of the spider 16 and engages gearing 22 of the floating shaft 23.

Stage 200 has the sun gear 7, a spider 29, journalling six planet wheels 1, etc., by means of bearings 28. Spider or planet carrier 29 is itself journalled in the housing by means of bearings 27. The planet gears mesh with the internal gear 8 being also affixed to case or housing 18. The sun gear 7 is of hollow construction and is provided with an internal gear 24 meshing with the gear 25 of the floating shaft 23. This shaft is, in addition, provided with spacer elements 34 and 35 which prevent the shaft from escaping axially.

The sun gear 37 of first stage 100 sits on a shaft 15 which is assumed to be capable of some radial displacement. This sun gear drives the three planet gears 31, etc., which revolve on internal gear 38, and the spider 16 drives the floating shaft 23 via gears 21, 22. As stated, gears 24 and 25 transmit the rotation of shaft 23 to the sun gear 7 of second stage 200. The sun gear 7 meshes with the planet gears such as 4 which roll on gear ring 8, thereby driving planet carrier or spider 29. Particularly the gearing between sun gear 7 and the planet gears on carrier or spider 29, and/or the gearing between these planet gears and the internal gear, permit some play if the floating shaft is radially or radially/axially (i.e. with skew) displaced. The spider 29, of course, drives, an output shaft 30 being journalled on housing 18 by bearings 32. In addition, the housing may be provided with means (not shown) which takes up any torque so as to prevent the case 18 from rotating.

The invention is not limited to the embodiments described above but all changes and modifications thereof not constituting departures from the spirit and scope of the invention are intended to be included.

We claim:
1. Planetary gearset comprising:
   a sun gear;
   an outer annulus with internal gear;
   a planet carrier;
   at least one of said gears and said carrier being radially displaceable; and
   six planet gears journalled on the carrier and meshing with the sun gear and the outer annulus;
   said six planet gears being arranged in groups of two each, wherein the spacings between the gears of and in each of the groups are smaller than the spacings from group-to-group,
   the spacings between the respective two gears in each of the groups not being the same for all three groups;
   three radial center lines of symmetry respectively for said two planet gears each of said three groups being angularly spaced by 120°.
2. Planetary gearset as in claim 1, wherein the spacings between the gears of two of said groups are equal, the spacing between the gears of a second one of the groups being larger.
3. Planetary gearset as in claim 1, said sun gear having an internal gear; and a floating shaft meshing the internal gear of the sun gear for driving the same.
4. Planetary gearset as in claim 1, said outer annulus being stationarily mounted.
5. A cascaded gearset including a first planetary gearset having a driven sun gear, a planet carrier, and an annulus with internal gear;
   a second planetary gearset constructed as set forth in claim 1; and
   a floating shaft geared to the planet carrier of the first planetary gear and to the sun gear of the second planetary gear.
6. A cascaded gearset as in claim 5, wherein said annuli are axially aligned and mounted in a casing.
7. A cascaded gearset as in claim 6, said first planetary gear having three planets.
8. A cascaded gearset as in claim 5, said floating shaft having two bulging spur gears, the planet carrier of the first planetary gear and the sun gear of the second planetry gear each having an internal gear respectively meshing with said spur gears.

* * * * *